(12) United States Patent
Fan et al.

(10) Patent No.: US 12,317,274 B2
(45) Date of Patent: May 27, 2025

(54) PHYSICAL DOWNLINK SHARED CHANNEL INCLUDING PART OF A DOWNLINK CONTROL INFORMATION

(71) Applicant: QUALCOMM Incorporated, San Diego, CA (US)

(72) Inventors: Zhifei Fan, San Diego, CA (US); Jing Sun, San Diego, CA (US); Xiaoxia Zhang, San Diego, CA (US); Tao Luo, San Diego, CA (US); Srinivas Yerramalli, Hyderabad (IN); Arumugam Chendamarai Kannan, San Diego, CA (US); Wooseok Nam, San Diego, CA (US); Sungwoo Park, Seoul (KR); Ahmed Abdelaziz Ibrahim Abdelaziz Zewail, San Diego, CA (US); Akula Aneesh Reddy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 615 days.

(21) Appl. No.: 17/159,383

(22) Filed: Jan. 27, 2021

(65) Prior Publication Data

US 2021/0243789 A1    Aug. 5, 2021

Related U.S. Application Data

(60) Provisional application No. 62/968,862, filed on Jan. 31, 2020.

(51) Int. Cl.
*H04W 72/23* (2023.01)
*H04L 1/00* (2006.01)

(52) U.S. Cl.
CPC ........... *H04W 72/23* (2023.01); *H04L 1/0009* (2013.01)

(58) Field of Classification Search
None
See application file for complete search history.

(56) References Cited

U.S. PATENT DOCUMENTS

| 10,321,386 B2 | 6/2019 | Wang et al. |
| 2015/0249564 A1 * | 9/2015 | Kim ................. H04L 5/001 |
|  |  | 370/329 |

(Continued)

FOREIGN PATENT DOCUMENTS

| WO | WO-2018199685 A1 * | 11/2018 | ............... H04L 1/00 |

OTHER PUBLICATIONS

Moon, English Translation of WO-2018199685-A1 (Year: 2018).*

(Continued)

*Primary Examiner* — Kenny S Lin
*Assistant Examiner* — Rodrick Mak
(74) *Attorney, Agent, or Firm* — Muncy, Geissler, Olds & Lowe, P.C.

(57) ABSTRACT

In an aspect, a PDCCH and a PDSCH are transmitted by a BS to a UE, whereby the PDDCH includes a first DCI part and the PDSCH includes a second DCI part. In an example, a TBS associated with the PDSCH may be determined (e.g., either by factoring or ignoring resource elements associated with the second DCI part). In another example, the PDSCH may be associated with a modulation scheme with a constellation having constellation points, whereby the second DCI part in the PDSCH is restricted to a subset of the constellation points. In another example, rate-matching may be performed for one or more resource elements of the second DCI part.

26 Claims, 16 Drawing Sheets

(56) References Cited

U.S. PATENT DOCUMENTS

| | | | |
|---|---|---|---|
| 2018/0124753 A1 | 5/2018 | Sun et al. | |
| 2018/0199268 A1* | 7/2018 | Wang | H04L 5/0053 |
| 2019/0246366 A1* | 8/2019 | Sadeghi | H04L 5/0053 |
| 2019/0260440 A1* | 8/2019 | Davydov | H04B 7/0482 |
| 2020/0367242 A1* | 11/2020 | Moon | H04L 1/00 |

OTHER PUBLICATIONS

Partial International Search Report—PCT/US2021/015404—ISA/EPO—Apr. 23, 2021.

QUALCOMM: "E-mail Discussions on 2-Stage DCI for NR", 3GPP Draft, TSG-RAN WG1 #88, R1-1702629 E-mail Discussions on 2-Stage DCI for NR, 3rd Generation Partnership Project (3GPP), Mobile Competence Centre, 650, Route Des Lucioles, F-06921, Sophia-Antipolis Cedex, France, vol. RAN WG1. No. Athens, Greece, Feb. 13, 2017-Feb. 17, 2017, Feb. 15, 2017, XP051222023, 12 Pages, Retrieved from the Internet: URL: http://www.3gpp.org/ftp/tsg_ran/WG1_RL1/TSGR1_88/Docs/ [retrieved on Fe. 15, 2017], Sections 1, 3, 4, Sections 2 and 4.1.

Zte, et al., "PDCCH Procedure and DCI Carried by POSCH Region", 3GPP TSG RAN WG1 Meeting #88, 3GPP Draft; R1-1701588, 3rd Generation Partnership Project (3GPP), Mobile Competence Centre; 650, Route Des Lucioles; F-06921 Sophia-Antipolis Cedex; France, Athens, Greece, Feb. 13, 2017-Feb. 17, 2017, pp. 1-4, Feb. 17, 2017 (Feb. 17, 2017), XP051220807, Retrieved from the Internet: URL: http://www.3gpp.org/ftp/tsg_ran/WG1_RL1/TSGR1_88/Docs/ Section 2, figures 1.2.

International Search Report and Written Opinion—PCT/US2021/015404—ISA/EPO—Jun. 15, 2021.

* cited by examiner

PHYSICAL DOWNLINK SHARED CHANNEL INCLUDING PART OF A DOWNLINK CONTROL INFORMATION

CROSS-REFERENCE TO RELATED APPLICATION

The present Application for Patent claims the benefit of U.S. Provisional Application No. 62/968,862, entitled "PDSCH INCLUDING PART OF A DCI COMMUNICATION", filed Jan. 31, 2020, assigned to the assignee hereof and hereby expressly incorporated by reference herein in its entirety.

BACKGROUND OF THE DISCLOSURE

1. Field of the Disclosure

Aspects of the disclosure relate generally to wireless communications and to techniques and apparatuses related to a Physical Downlink Shared Channel (PDSCH) including part of a Downlink Control Information (DCI).

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some systems, to reduce control overhead and improve the processing timeline, a downlink control information (DCI) may be split into two portions (or parts). A first DCI portion may be transmitted within a PDCCH, while a second DCI portion may be transmitted within a Physical Downlink Shared Channel (PDSCH), a procedure commonly referred to as a DCI piggyback. The PDCCH and associated PDSCH carrying the respective DCI portions may be transmitted in the same slot or in different slots. The first DCI portion may include initial control information regarding an assignment (or grant), such as the resource assignment, rank and modulation order of the assignment (e.g., UL grant or DL grant). In addition, the first DCI portion may also include control information about the second DCI portion in a control information field.

In an aspect of the disclosure, a method, a computer-readable medium, and an apparatus are provided. The apparatus may be a base station. The base station may schedule, during at least one slot, transmission of a Physical Downlink Control Channel (PDCCH) and a Physical Downlink Shared Channel (PDSCH), the PDCCH including a first part of a Downlink Control Information (DCI), the PDSCH including a second part of the DCI, wherein the scheduling includes determining a transport block size (TBS) associated with the PDSCH, and may transmit the PDCCH and the PDSCH during the at least one slot, wherein the PDSCH is transmitted in accordance with the determined TBS In another aspect of the disclosure, a method, a computer-readable medium, and an apparatus are provided. The apparatus may be a UE. The UE may receive, during at least one slot, transmission from a base station of a Physical Downlink Control Channel (PDCCH) and a Physical Downlink Shared Channel (PDSCH), the PDCCH including a first part of a Downlink Control Information (DCI), the PDSCH including a second part of the DCI, and may determine a transport block size (TBS) associated with the PDSCH In another aspect of the disclosure, a method, a computer-readable medium, and an apparatus are provided. The apparatus may be a base station. The base station may schedule, during at least one slot, transmission of a Physical Downlink Control Channel (PDCCH) and a Physical Downlink Shared Channel (PDSCH), the PDCCH including a first part of a Downlink Control Information (DCI), the PDSCH including a second part of the DCI, and may transmit the PDCCH and the PDSCH during the at least one slot, wherein the PDSCH is transmitted via a modulation scheme associated with a constellation having a plurality of constellation points, and wherein the second part of the DCI in the PDSCH is restricted to a subset of the plurality of constellation points.

In another aspect of the disclosure, a method, a computer-readable medium, and an apparatus are provided. The apparatus may be a UE. The UE may receive, during at least one slot, transmission from a base station of a Physical Downlink Control Channel (PDCCH) including a first part of a Downlink Control Information (DCI), and may receive, during the at least one slot, transmission from the base station of a Physical Downlink Shared Channel (PDSCH) including a second part of the DCI, wherein the PDSCH is received via a modulation scheme associated with a constellation having a plurality of constellation points, and wherein the second part of the DCI in the PDSCH is restricted to a subset of the plurality of constellation points In another aspect of the disclosure, a method, a computer-readable medium, and an apparatus are provided. The apparatus may be a base station. The base station may schedule, during at least one slot, transmission of a Physical Downlink Control Channel (PDCCH) and a Physical Downlink Shared Channel (PDSCH), the PDCCH including a first part of a Downlink Control Information (DCI), the PDSCH including a second part of the DCI, wherein the scheduling includes a determination of a transport block size (TBS) associated with the PDSCH, and may transmit the PDCCH and the PDSCH during the at least one slot, wherein one or more resource elements associated with the second part of the DCI in the PDSCH are rate-matched: sequentially, starting with a beginning of the one or more resource elements, or only if the PDSCH occurs within a threshold period of time following a Demodulation Reference Signal (DMRS).

In an aspect of the disclosure, a method, a computer-readable medium, and an apparatus are provided. The apparatus may be a UE. The UE may receive, during at least one slot, transmission from a base station of a Physical Downlink Control Channel (PDCCH) and a Physical Downlink Shared Channel (PDSCH), the PDCCH including a first part of a Downlink Control Information (DCI), the PDSCH including a second part of the DCI, and may rate-match one or more resource elements associated with the second part of the DCI in the PDSCH: sequentially, starting with a beginning of the one or more resource elements, or only if the PDSCH occurs within a threshold period of time following a Demodulation Reference Signal (DMRS).

Aspects generally include a method, apparatus, system, computer program product, non-transitory computer-readable medium, user equipment, cIoT user equipment, base station, wireless communication device, and/or processing system as substantially described with reference to and as illustrated by the drawings, and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
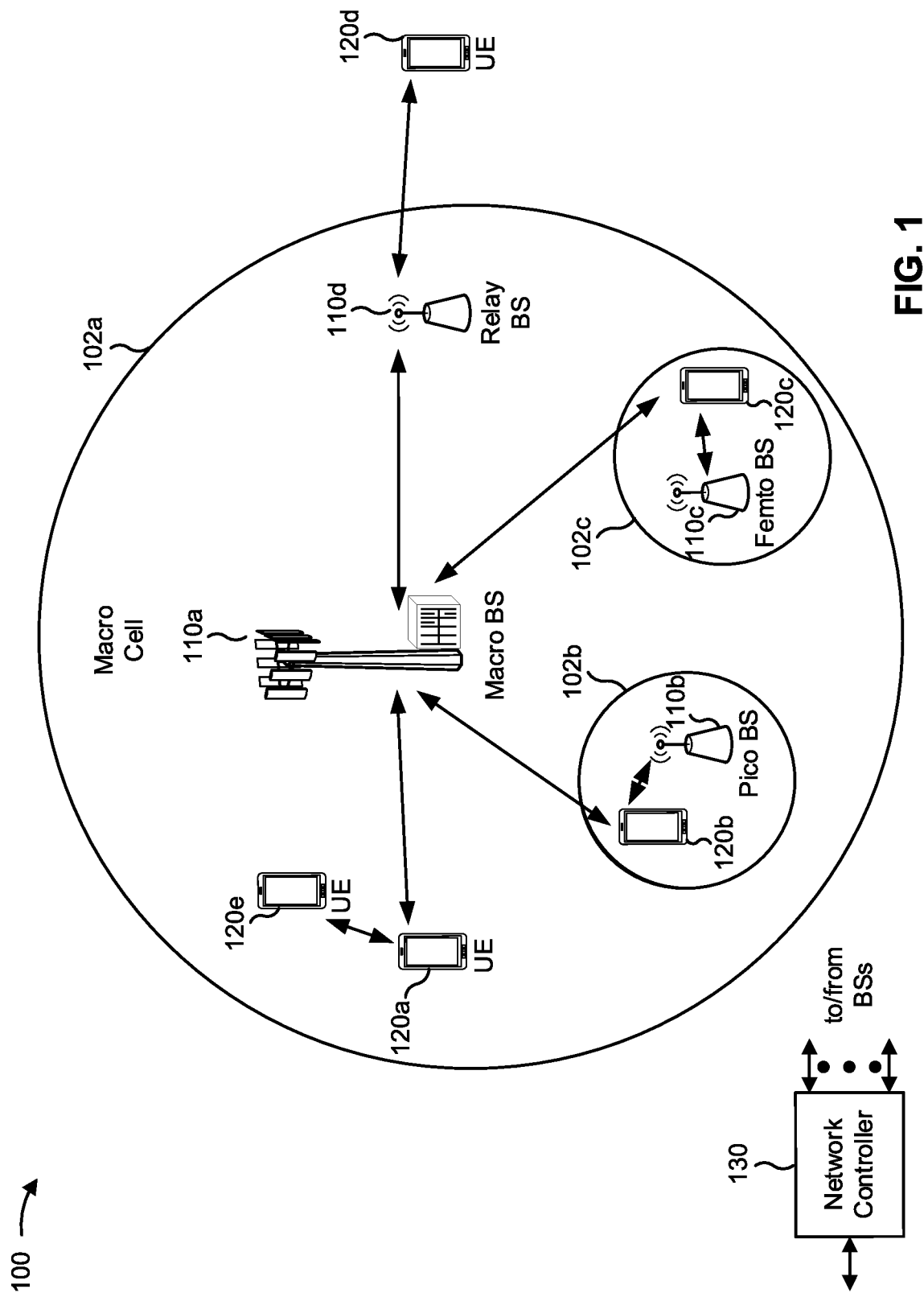
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a wireless network 100 in which aspects of the present disclosure may be practiced. The wireless network 100 may be an LTE network or some other wireless network, such as a 5G network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. "MTC" may refer to MTC or eMTC. MTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. IoT UEs, eMTC UEs, coverage enhancement (CE) mode UEs, bandwidth-limited (BL) UEs, and other types of UEs that operate using diminished power consumption relative to a baseline UE may be referred to herein as cellular IoT (cIoT) UEs. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., abase station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Access to the air interface may be controlled, for example, using a unified access control (UAC) system in which UEs are associated with an access identity (e.g., an access class and/or the like), which may aim to ensure that certain high-priority UEs (e.g., emergency response UEs, mission critical UEs, and/or the like) can access the air interface even in congested conditions. Updates to the UAC parameters (e.g., priority levels associated with access identities, which access identities are permitted to access the air interface, and/or the like) may be provided for cIoT UEs using a message, such as a paging message or a direct indication information, which may conserve battery power of cIoT UEs.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples may differ from what is described with regard to FIG. 1.

Figure 2:
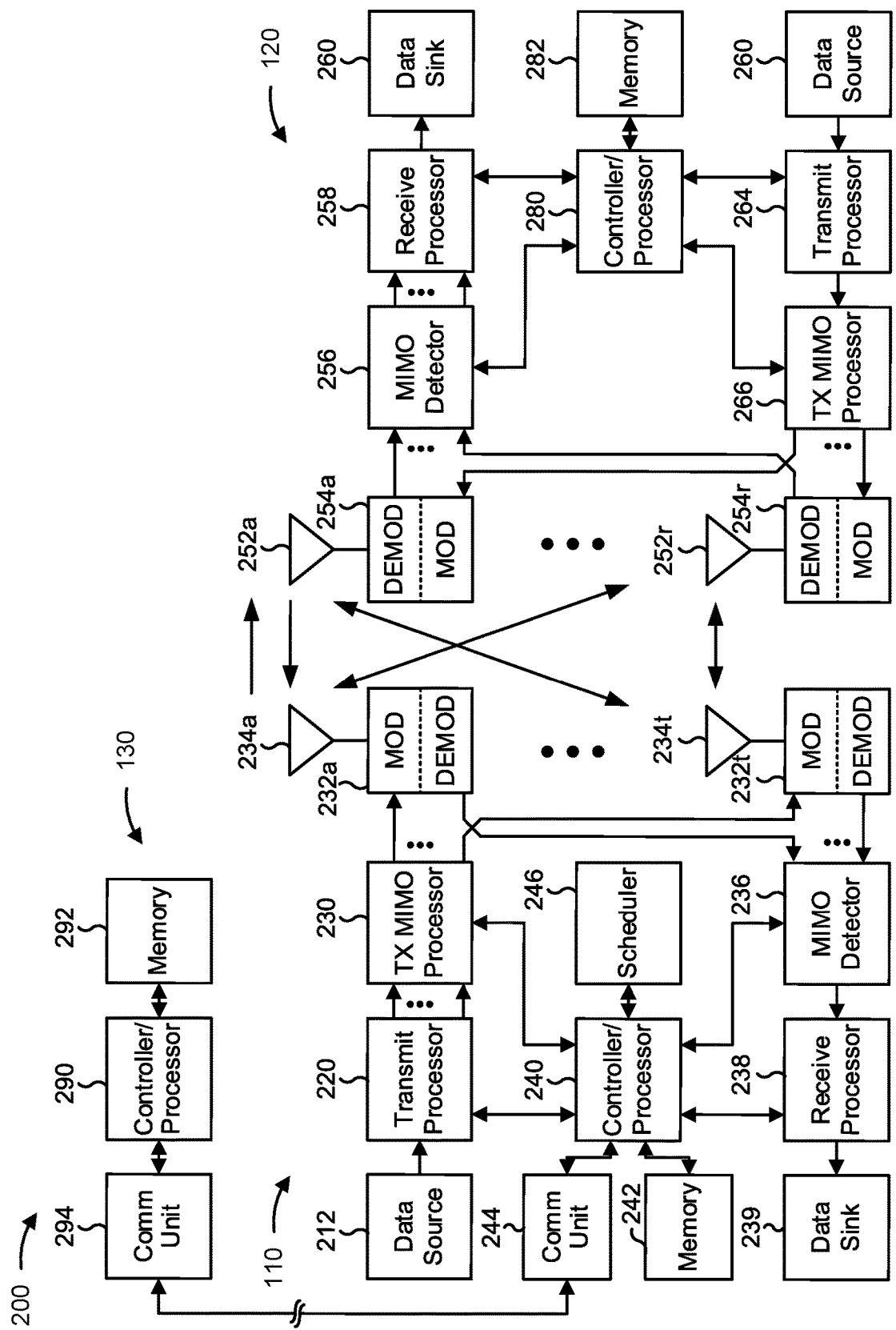
FIG. 2 is a diagram illustrating an example of a base station in communication with a UE in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency divisional multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), a reference signal received quality (RSRQ), a channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with UAC parameter updating, as described in more detail elsewhere herein. For example, controller/processor 240 of base station 110, controller/processor 280 of UE 120, and/or any other component(s) of FIG. 2 may perform or direct operations of various processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

As noted above, various device types may be characterized as UEs. Starting in 3GPP Rel. 17, a number of these UE types are being allocated a new UE classification denoted as Reduced Capability ('RedCap') or 'NR-Light'. Examples of UE types that fall under the RedCap classification include wearable devices (e.g., smart watches, etc.), industrial sensors, video cameras (e.g., surveillance cameras, etc.), and so on. Generally, the UE types grouped under the RedCap classification are associated with lower communicative capacity. For example, relative to 'normal' UEs (e.g., UEs not classified as RedCap), RedCap UEs may be limited in terms of maximum bandwidth (e.g., 5 MHz, 10 MHz, 20 MHz, etc.), maximum transmission power (e.g., 20 dBm, 14 dBm, etc.), number of receive antennas (e.g., 1 receive antenna, 2 receive antennas, etc.), and so on. Some RedCap UEs may also be sensitive in terms of power consumption (e.g., requiring a long battery life, such as several years) and may be highly mobile. Moreover, in some designs, it is generally desirable for RedCap UEs to co-exist with UEs implementing protocols such as eMBB, URLLC, LTE NB-IoT/MTC, and so on.

A Physical Downlink Control Channel (PDCCH) may be used to carry a Downlink Control Information (DCI) communication. The DCI within the PDCCH provides downlink resource assignments and/or uplink resource grants for one or more UEs. Multiple PDCCHs may be transmitted each slot and each PDCCH may carry user-specific DCI or common DCI (e.g., control information broadcast to a group of UEs). Each DCI may further include a cyclic redundancy check (CRC) bit that is scrambled with a radio network temporary identifier (RNTI), which may be a specific user RNTI or a group RNTI, to allow the UE to determine the type of control information sent in the PDCCH.

In some systems, to reduce control overhead and improve the processing timeline, the DCI may be split into two portions. A first DCI portion may be transmitted within a PDCCH, while a second DCI portion, referred to as a DCI 'piggyback' may be transmitted within a Physical Downlink Shared Channel (PDSCH). The PDCCH and associated PDSCH carrying the respective DCI portions may be transmitted in the same slot or in different slots.

The first DCI portion may include initial control information regarding an assignment (or grant), such as the resource assignment, rank and modulation order of the assignment (e.g., UL grant or DL grant). In addition, the first DCI portion may also include control information about the second DCI portion in a control information field. In some examples, the control information may indicate the number of resource elements (size) and code rate of the second DCI portion. The second DCI portion may include remaining control information regarding the grant (and/or other grant(s)). For example, the remaining control information may include non-time critical control information, such as the HARQ process ID, redundancy version ID, a new data indicator, transmit power control indicator, channel quality indicator request, sounding reference signal request, or downlink assignment index. Thus, the UE may utilize the first DCI portion to identify user data traffic within the PDSCH to be decoded and may buffer the user data traffic while the second DCI portion is decoded.

As noted above, the second DCI portion may include multiple grants (e.g., one or more UL grants, one or more DL grants, or a combination thereof). The second DCI portion may be either single-user or multi-user (e.g., using a group RNTI for the first DCI portion in conjunction with an addressing scheme in the second DCI portion for respective UEs to extract their respective parts). In some designs, the first DCI portion can be scheduled in accordance with a semi-persistent scheduling (SPS) protocol, whereas the second DCI portion can be dynamically scheduled via higher-layer signaling (e.g., RRC signaling).

In some NR systems, PDCCH is delivered in the Control Resource Set (coreset). A UE may perform blind decoding (BD) of multiple BD candidates in the coreset to identify a particular DCI targeting that UE. In an example, the PDDCH may be sent with a wider beam than the PDSCH, or alternatively via the same beam as the PDSCH. The BD candidates may be organized in search space sets, and one or more search space sets may be associated with one coreset. The NR PDCCH BD design is carried over from the LTE PDCCH BD design, and is generally optimized for the scenario where multiple UEs are served with PDCCH at the same time (e.g., optimized so as to reduce blocking between UEs to randomly hash locations of PDDCH from different UEs differently in the coreset). In a millimeter wave (mmW) use case, due to the analog beam transmission restriction and very short slots in time domain (due to SCS scaling up) in some NR systems, the chance of sending multiple DCIs to different UEs is greatly reduced (compared to FR1). Instead, it is more likely in such NR systems for multiple DL/UL grants to be transmitted to the same UE (e.g., multiple DL/UL grants to handle relatively long DL/UL bursty traffic).

The above-noted piggybacked DCI design may be particularly useful for mmW implementations. For example, the piggybacked DCI design can help to reduce PDDCH BD so the UE PDCCH processing is made faster. In another example, the piggyback DCI (or second DCI portion) may share the same beam as the PDSCH (e.g., same QCL) and thus can be more efficiently delivered (e.g., the beam used for PDSCH can be narrower than the PDSCH beam).

In some designs, as more DCIs are made part of a PDSCH, fewer PDSCH resource elements (REs) remain for transporting non-DCI traffic. This may impact (i.e., reduce) the coding rate (e.g., transport block size (TBS)) for the traffic part of the PDSCH, which in turn makes it more difficult for the UE to decode the PDSCH.

Figure 3:
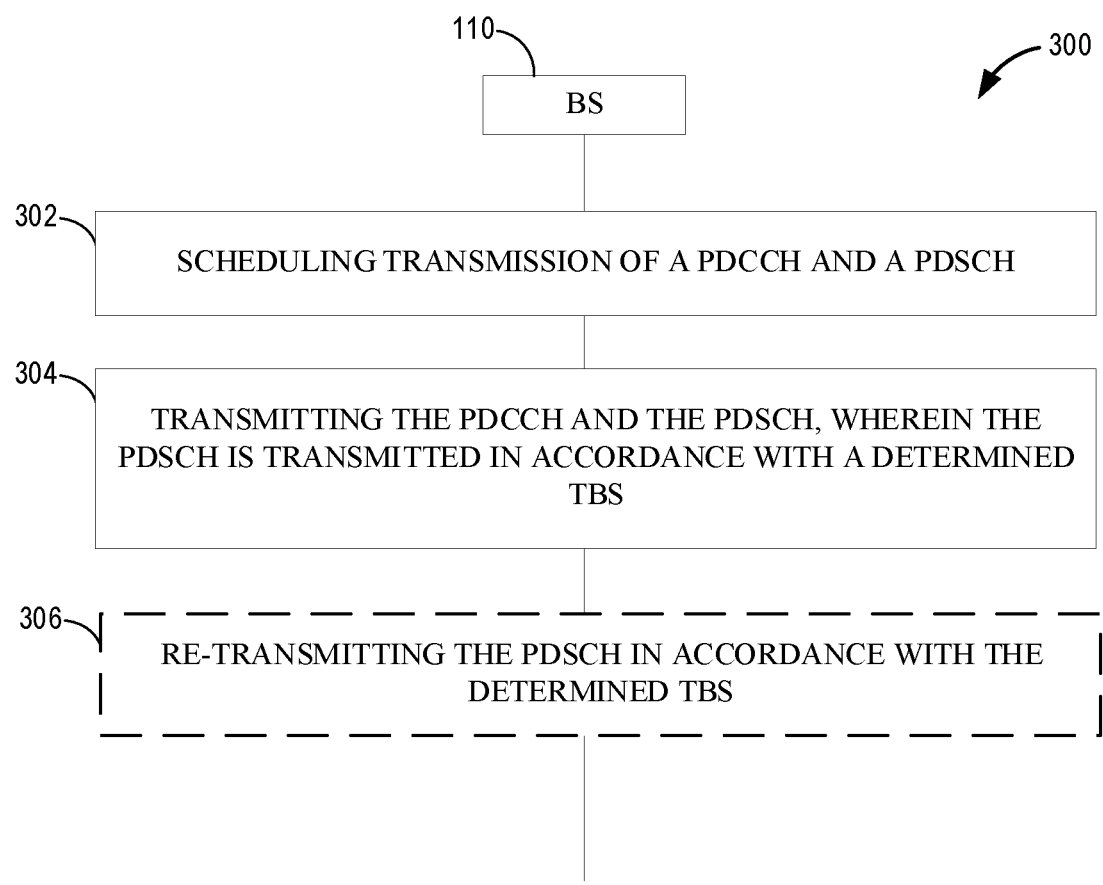
FIG. 3 illustrates an exemplary process of wireless communications according to an aspect of the disclosure.

FIG. 3 illustrates an exemplary process 300 of wireless communications according to an aspect of the disclosure. The process 300 of FIG. 3 is performed by BS 110.

At 302, BS 110 (e.g., scheduler 246, controller/processor 240, etc.) schedules, during at least one slot, transmission of a PDCCH and a PDSCH, the PDCCH including a first part of a DCI, the PDSCH including a DCI portion that includes a second part of the DCI, wherein the scheduling includes determining a transport block size (TBS) associated with the PDSCH. In an example, the first and second parts of the DCI may comprise a two-part DCI as described above. In some designs, the first DCI part may include a control information field associated with the second part of the DCI within the PDSCH. The second part of the DCI may comprise UL grant(s) and/or DL grant(s), and may be associated with a single UE or multiple UEs.

At 304, BS 110 (e.g., antenna(s) 234a . . . 234t, modulators(s) 232a . . . 232a, TX MIMO processor 230, TX processor 220) transmits the PDCCH and the PDSCH during the at least one slot. The PDSCH is transmitted at 304 in accordance with the determined TBS from 302. In an example, the at least one slot may comprise a single slot or multiple slots.

At 306, BS 110 (e.g., antenna(s) 234a . . . 234t, modulators(s) 232a . . . 232a, TX MIMO processor 230, TX processor 220) optionally re-transmits the PDSCH in accordance with the determined TBS (e.g., irrespective of whether the re-transmitted PDSCH includes the second part of the DCI). In an example, the optional re-transmission that re-uses the determined TBS may be implemented for a scenario where the TBS determination is based on a set of resources occupied by PDSCH data (i.e., traffic) and excludes a subset of the set of resource elements allocated for transport of the second part of the DCI.

Figure 4:
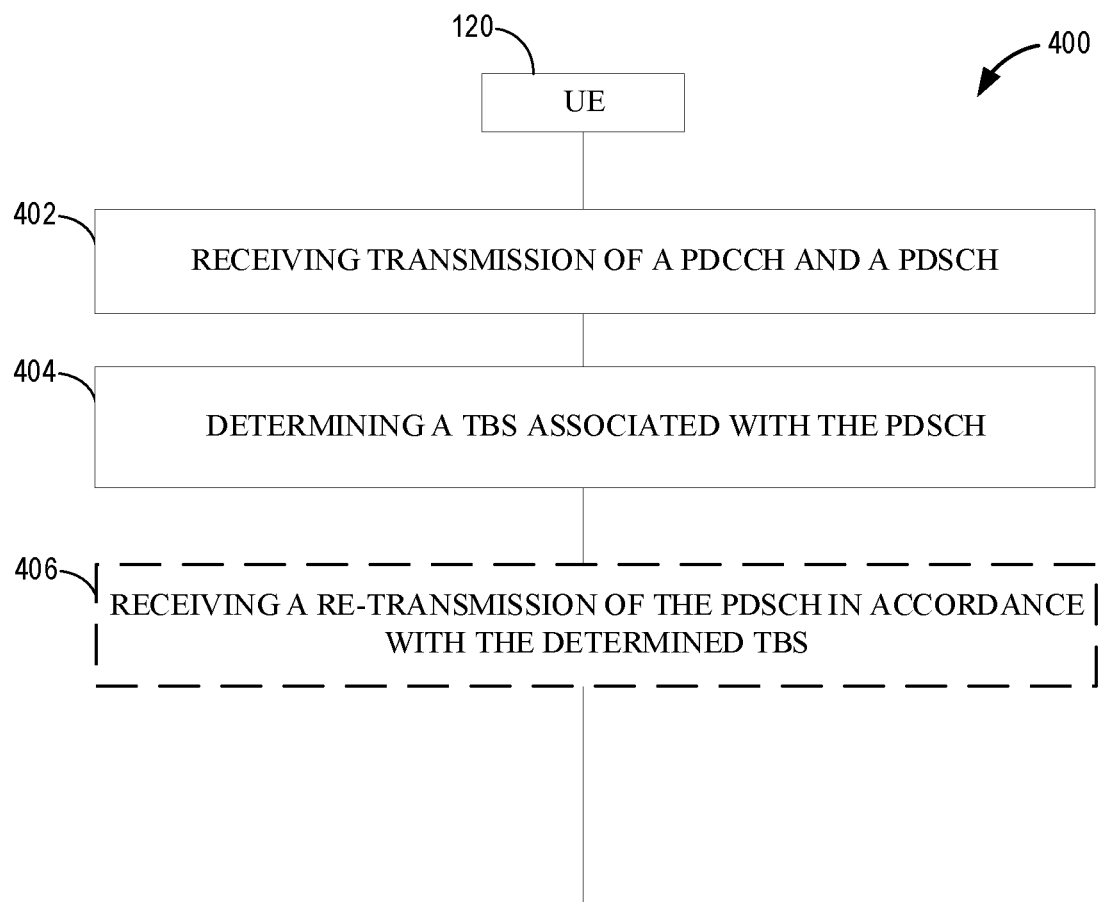
FIG. 4 illustrates another exemplary process of wireless communications according to an aspect of the disclosure.

FIG. 4 illustrates an exemplary process 400 of wireless communications according to an aspect of the disclosure. The process 400 of FIG. 4 is performed by UE 120.

At 402, UE 120 (e.g., antenna(s) 252a . . . 252r, MIMO detector 256, receive processor 258, etc.) receives, during at least one slot, transmission from a base station of a Physical Downlink Control Channel (PDCCH) and a Physical Downlink Shared Channel (PDSCH), the PDCCH including a first part of a Downlink Control Information (DCI), the PDSCH including a second part of the DCI. In an example, the second part of the DCI in the PDSCH may be a second DCI portion associated with the first DCI part (or initial part of the DCI) in the PDCCH that includes a control information field associated with the second part of the DCI within the PDSCH. In some designs, the second part of the DCI may comprise UL grant(s) and/or DL grant(s), and may be associated with a single UE or multiple UEs. In an example, the at least one slot may comprise a single slot or multiple slots.

At 404, UE 120 (e.g., controller/processor 280) determines a transport block size (TBS) associated with the PDSCH. The TBS determination 404 may be performed in a variety of ways, as will be described below in more detail. For example, the TBS determination at 404 may be performed (i) before an allocation of resource elements among a set of PDSCH resource elements for transport of the second part of the DCI (e.g., without consideration of which resource elements among a set of PDSCH resource elements are allocated for transport of the second part of the DCI), (ii) based on a set of resources occupied by PDSCH data and excludes a subset of the set of resource elements allocated for transport of the second part of the DCI, (iii) in accordance with a TBS adjustment that is explicitly indicated to the UE (e.g., via the control information field in the first DCI portion of the PDCCH), or (iv) in accordance with a TBS adjustment that is implicitly indicated by the control information field (e.g., via the control information field in the first DCI portion of the PDCCH).

At 406, UE 120 (e.g., antenna(s) 252a . . . 252r, MIMO detector 256, receive processor 258, etc.) optionally receives a re-transmission of the PDSCH in accordance with the determined TBS (e.g., irrespective of whether the re-transmitted PDSCH includes the second part of the DCI). In an example, the optional re-transmission that re-uses the determined TBS may be implemented for a scenario where the TBS determination is based on a set of resources occupied by PDSCH data (i.e., traffic) and excludes a subset of the set of resource elements allocated for transport of the second part of the DCI.

Referring to FIGS. 3-4, in a first example, the TBS determination at 302 of FIG. 3 or 404 of FIG. 4 may be performed before an allocation of resource elements among a set of PDSCH resource elements for transport of the second part of the DCI (e.g., without consideration of which resource elements among a set of PDSCH resource elements are allocated for transport of the second part of the DCI (a procedure commonly referred to as a DCI piggyback). In this case, the TBS is not impacted by the piggybacked DCI (or second DCI portion in the PDSCH), and the PDSCH resource elements allocated for transport of the second part of the DCI may be determined after the TBS determination. For example, the TBS can be determined with an allocation size (e.g., number of symbols, number of resource blocks, DMRS overhead, and configurable fixed overhead) and modulation and coding scheme (MCS), after which the resource elements for the piggybacked DCI may be calculated with the higher layer configure beta values. As a result, the coding rate may be higher than indicated by the MCS. This may be problematic in a scenario where the piggybacked DCI size represents a substantial portion of the TBS. In this case, the MCS of the PDSCH may be as a tuning parameter to adjust the determined TBS to offset a coding rate associated with the resource elements allocated for transport of the piggybacked DCI (e.g., to adjust the TBS to a suitable level). For example, if the data and piggyback DCI are transmitted together in PDSCH, and the piggyback DCI has substantially large payload size (e.g., above some threshold), gNB could schedule a smaller MCS rather than the one decided by the rate control. In this way, the true coding rate after discounting the piggy backed DCI will not be too large to fail the decoding. In some designs, the MCS jointly controls the modulation order and coding rate (e.g., in which case dropping the MCS intentionally will drop both aspects, thus the modulation order will also be impacted).

Referring to FIGS. 3-4, in a second example, the TBS determination at 302 of FIG. 3 or 404 of FIG. 4 may be performed based on a set of resources occupied by PDSCH data (e.g., traffic) while excluding (from the TBS determination or calculation) a subset of the set of resource elements allocated for transport of the second part of the DCI. For example, the control information field may indicate a number of resource elements in the subset, and the TBS determination may subtract the number of resource elements in the subset from a total number of the set of resource elements occupied by the PDSCH data. In one example, the number of DCI resource elements in the PDSCH may be calculated as follows:

$$\alpha \sum_{l=l_0}^{N_{symb,all}^{PDSCH}-1} M_{SC}^{DCI}(l) \quad \text{Expression 1}$$

whereby:
$l_0$ is the symbol index of the first OFDM symbol that does not carry DMRS in PDSCH
$M_{SC}^{DCI}(l)$ is the number of resource elements that could carry on DCI.

If a symbol carries on DMRS, and PDSCH is multiplexed with DMRS, $M_{SC}^{DCI}(1) = M_{SC}^{PDSCH}(1) - M_{SC}^{DMRS}(1)$ If PDSCH is not transmitted in DMRS symbol, $M_{SC}^{DCI}(1) = 0$.

If a symbol does not carry on DMRS, $M_{SC}^{DCI}(1) = M_{SC}^{PDSCH}(1) - M_{SC}^{PTRS}(1)$ α is configured by higher layer or configured by first part of the DCI in PDCCH.

The number of REs occupied by PDSCH traffic data can then be calculated by subtracting the REs occupied by DCI in accordance with Expression 1, after which the TBS can be calculated accordingly. In such a design, the base station may maintain the same TBS size for an (optional) re-transmission of the PDSCH. Referring to FIGS. 3-4, in a third example, the TBS determination at 302 of FIG. 3 or 404 of FIG. 4 may be performed in accordance with a TBS adjustment (e.g., relative to a 'normal' TBS calculation per standard) that is explicitly or implicitly indicated by the base station to the UE. In an example, the TBS adjustment may be explicitly indicated to the UE as a percentage of TBS size reduction in the determined TBS. In another example, the TBS adjustment may be explicitly indicated the UE as an absolute TBS size reduction in the determined TBS. In some cases, no TBS may be transmitted at all (e.g., effectively 100% TBS size reduction, e.g., which may occur if the DCI part of the PDSCH is extremely high). In some designs, the TBS adjustment can be binary (e.g., either 0% TBS reduction or no change from normal TBS calculation procedure, or 100% TBS reduction to indicate that the PDSCH contains no traffic part). In some designs, the TBS adjustment may be explicitly indicated to the UE via the control information field of the initial part (or first part) of the DCI in the PDCCH. In other designs, the TBS adjustment may be explicitly indicated to the UE via the second part of the DCI in the PDSCH. In other designs, the TBS adjustment is implicitly indicated to the UE as a size of the piggybacked DCI within the PDSCH conveyed via the control information field in the first DCI portion of the PDCCH (e.g., the UE 120 can factor the piggybacked DCI size into its own TBS adjustment calculation).

Figure 5:
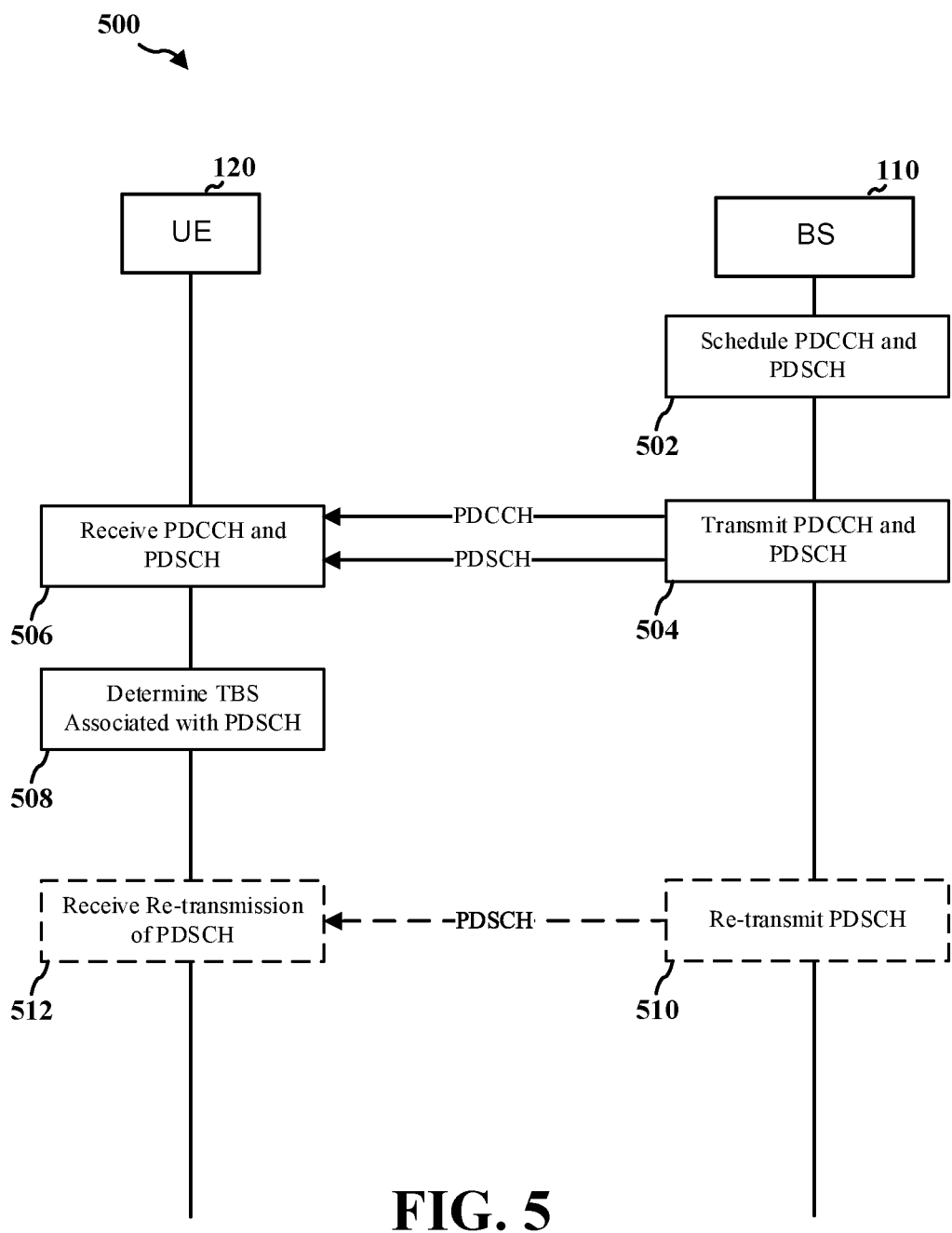
FIG. 5 illustrates an example implementation of the processes of FIGS. 3-4 in accordance with an embodiment of the disclosure.

FIG. 5 illustrates an example implementation 500 of the processes 300-400 of FIGS. 3-4 in accordance with an embodiment of the disclosure.

At 502, BS 110 schedules transmission of the PDCCH and PDSCH (e.g., with the PDSCH being associated with a TBS determined in accordance with any of the methodologies noted above). In an example, 502 may correspond to 302 of FIG. 3 (e.g., the scheduled PDCCH may comprise an initial or first DCI part with the PDSCH comprising a piggybacked DCI that includes the second DCI part, etc.). The respective DCI parts may be associated with one or more grants, such as UL grant(s), DL grant(s) or a combination thereof, which in turn may be associated with a single UE or multiple UEs.

At 504, BS 110 transmits the PDCCH and PDSCH to UE 120 (e.g., and possibly other UEs associated with the grant(s) in one or more DCIs of the PDSCH), and the UE 120 receives the PDCCH and PDSCH at 506. For example, similar to 304 of FIG. 3 or 402 of FIG. 4, the PDSCH is transmitted at 504 in accordance with the determined TBS from 502. In an example, the at least one slot may comprise a single slot or multiple slots. Further, the grant(s) may comprise UL grant(s) and/or DL grant(s), and may be associated with a single UE or multiple UEs.

At 508, UE 120 determines (e.g., based on a control information field in the first DCI portion of the PDCCH) the TBS associated with the PDSCH (e.g., which facilitates a decoding operation at UE 120 with respect to the PDSCH). In an example, 508 may correspond to 404 of FIG. 4, whereby the TBS determination at may be performed (i) before an allocation of resource elements among a set of PDSCH resource elements for transport of the second part of the DCI (e.g., without consideration of which resource elements among a set of PDSCH resource elements are allocated for transport of the second part of the DCI), (ii) based on a set of resources occupied by PDSCH data and excludes a subset of the set of resource elements allocated for transport of the second part of the DCI, (iii) in accordance with a TBS adjustment that is explicitly indicated to the UE (e.g., via the control information field in the first DCI portion of the PDCCH), or (iv) in accordance with a TBS adjustment that is implicitly indicated by the control information field (e.g., via the control information field in the first DCI portion of the PDCCH).

At 510, BS 110 optionally re-transmits the PDSCH, which is received by UE 120 at 512. In an example, as in 306 of FIG. 3 or 406 of FIG. 4, the optional re-transmission that re-uses the determined TBS may be implemented for a scenario where the TBS determination is based on a set of resources occupied by PDSCH data (i.e., traffic) and excludes a subset of the set of resource elements allocated for transport of the second part of the DCI.

Figure 6:
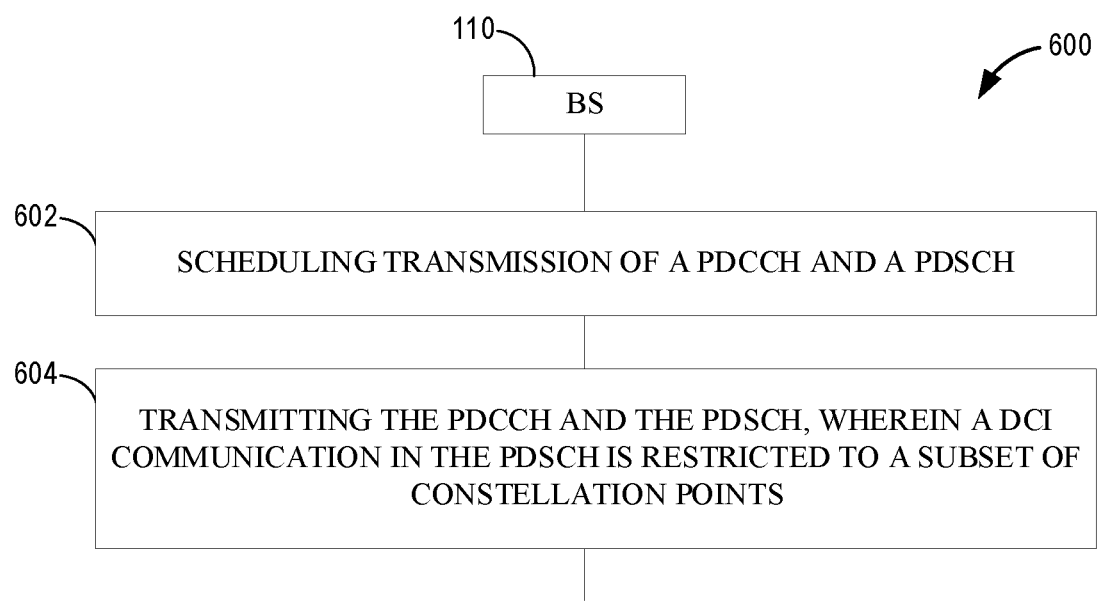
FIG. 6 illustrates another exemplary process of wireless communications according to an aspect of the disclosure.

FIG. 6 illustrates an exemplary process 600 of wireless communications according to an aspect of the disclosure. The process 600 of FIG. 6 is performed by BS 110.

At 602, BS 110 (e.g., scheduler 246, controller/processor 240, etc.) schedules, during at least one slot, transmission of a PDCCH and a PDSCH, the PDCCH including a first part of a Downlink Control Information (DCI), the PDSCH including a second part of the DCI. In an example, the first and second parts of the DCI may comprise a two-part DCI as described above. In some designs, the first DCI portion (or initial part of the DCI) in the PDCCH includes a control information field associated with the second part of the DCI within the PDSCH. In some designs, the second part of the DCI comprise UL grant(s) and/or DL grant(s), and may be associated with a single UE or multiple UEs.

At 604, BS 110 (e.g., antenna(s) 234a . . . 234t, modulators(s) 232a . . . 232a, TX MIMO processor 230, TX processor 220) transmits the PDCCH and the PDSCH during the at least one slot. In particular, the PDSCH is transmitted via a modulation scheme associated with a constellation having a plurality of constellation points, and the second part of the DCI in the PDSCH is restricted to a subset of the plurality of constellation points. For example, the modulation scheme may be Quadrature Phase Shift Keying (QPSK). In a further example, the restricted subset of constellation points may correspond to the four outermost constellation points among the plurality of constellation points. In this manner, the piggybacked DCI REs are effectively power boosted (e.g., in some cases, for suppressed carrier (SC) waveforms at frequencies in excess of 71 GHz).

Figure 7:
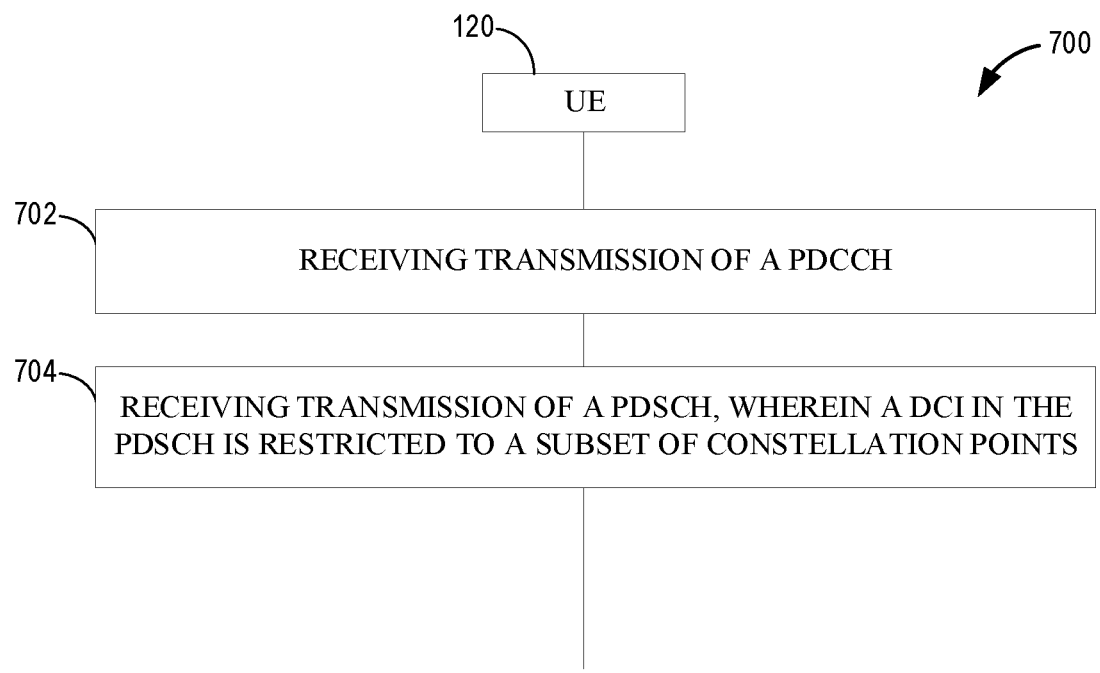
FIG. 7 illustrates another exemplary process of wireless communications according to an aspect of the disclosure.

FIG. 7 illustrates an exemplary process 700 of wireless communications according to an aspect of the disclosure. The process 700 of FIG. 7 is performed by UE 120.

At 702, UE 120 (e.g., antenna(s) 252a . . . 252r, MIMO detector 256, receive processor 258, etc.) receives, during at least one slot, transmission from a base station of a PDCCH including a first part of a DCI. For example, the first DCI portion (or part) may comprise a control information field associated with a second DCI portion (or piggybacked DCI) in an associated PDSCH.

At 704, UE 120 (e.g., antenna(s) 252a . . . 252r, MIMO detector 256, receive processor 258, etc.) receives, during the at least one slot, transmission from the base station of a PDSCH including a second part of the DCI. In an example, the first and second parts of the DCI may comprise a two-part DCI as described above. In some designs, the first part of the DCI may comprise a control information field associated with the second part of the DCI within the PDSCH. In some designs, the second part of the DCI may comprise UL grant(s) and/or DL grant(s), and may be associated with a single UE or multiple UEs. In an example, the at least one slot may comprise a single slot or multiple slots. In particular, the PDSCH is received via a modulation scheme associated with a constellation having a plurality of constellation points, and the second part of the DCI in the PDSCH is restricted to a subset of the plurality of constellation points. For example, the modulation scheme may be QPSK. In a further example, the restricted subset of constellation points may correspond to the four outermost constellation points among the plurality of constellation points. In this manner, the piggybacked DCI REs are effectively power boosted (e.g., in some cases, for SC waveforms at frequencies in excess of 71 GHz).

Figure 8:
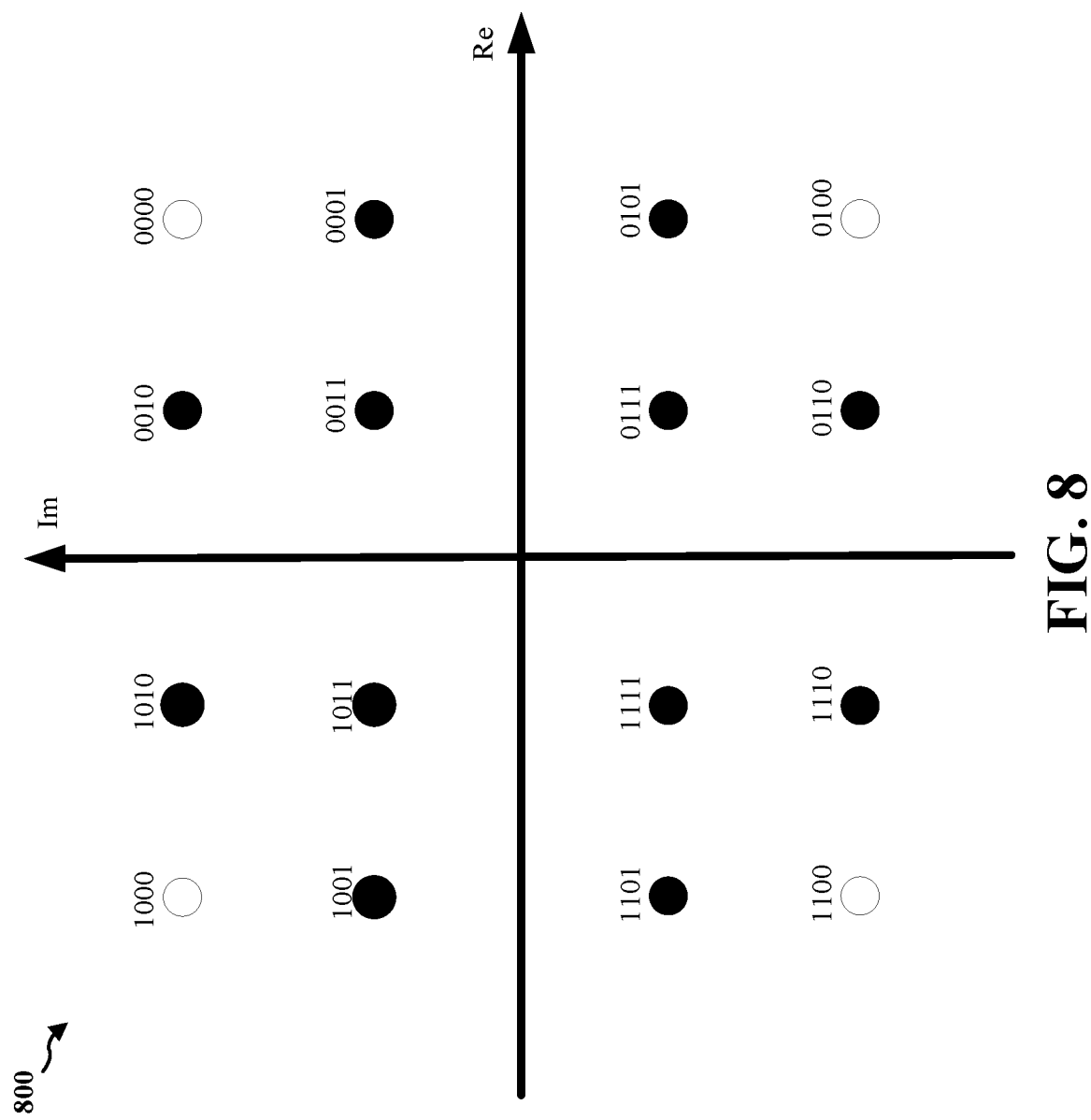
FIG. 8 illustrates a constellation point allocation associated with a QPSK-based PDSCH transmission of a piggy-backed DCI in accordance with the processes of FIGS. 6-7 in accordance with an embodiment of the disclosure.

FIG. 8 illustrates a constellation point allocation 800 associated with a QPSK-based PDSCH transmission of a piggybacked (second part) DCI in accordance with the processes 600-700 of FIGS. 6-7 in accordance with an embodiment of the disclosure. In FIG. 8, sixteen constellation points [0000, 0001, ... 1111] are associated with the QPSK for the PDSCH. However, the piggybacked DCI is restricted to four outermost constellation points, denoted as constellation points 0000, 0100, 1000 and 1100.

Figure 9:
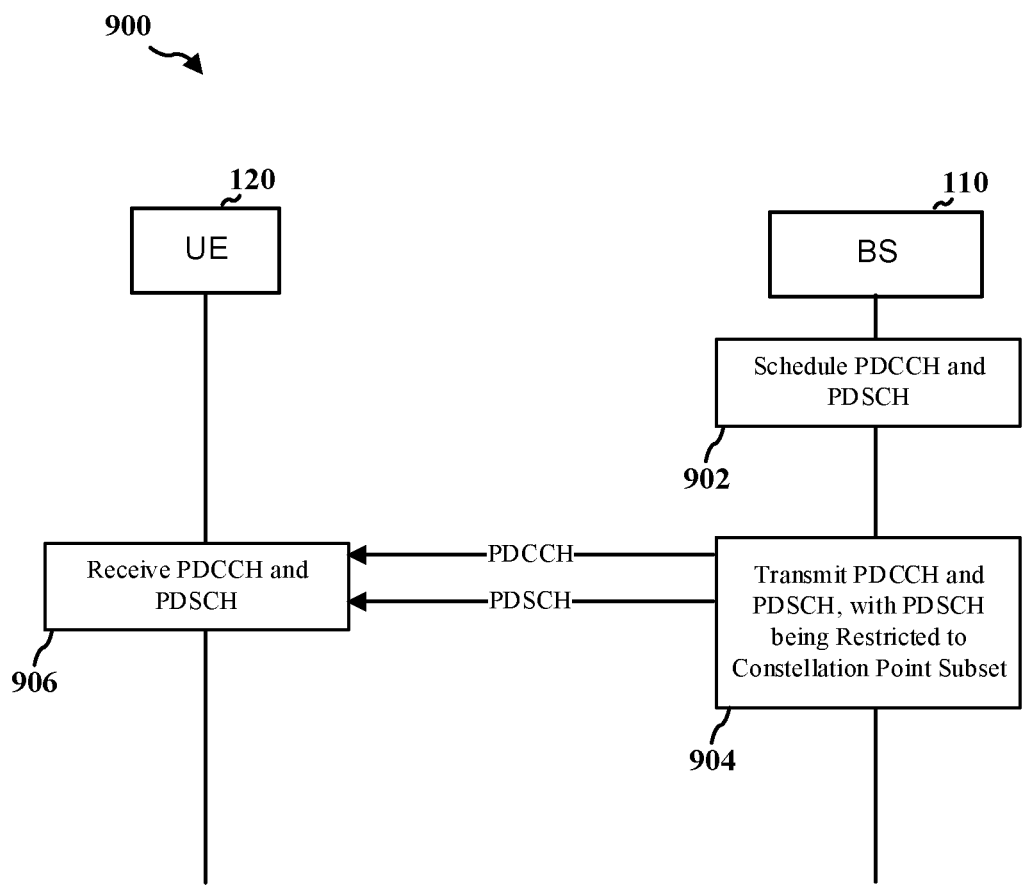
FIG. 9 illustrates an example implementation of the processes of FIGS. 6-7 in accordance with an embodiment of the disclosure.

FIG. 9 illustrates an example implementation 900 of the processes 600-700 of FIGS. 6-7 in accordance with an embodiment of the disclosure.

At 902, BS 110 schedules transmission of the PDCCH and PDSCH. In an example, 902 may correspond to 602 of FIG. 6 (e.g., the scheduled PDCCH may comprise an initial (or first) DCI part with the PDSCH comprising a piggybacked DCI that includes the second DCI part, etc.). The respective DCI parts may be associated with one or more grants, such as UL grant(s), DL grant(s) or a combination thereof, which in turn may be associated with a single UE or multiple UEs.

Figure 10:
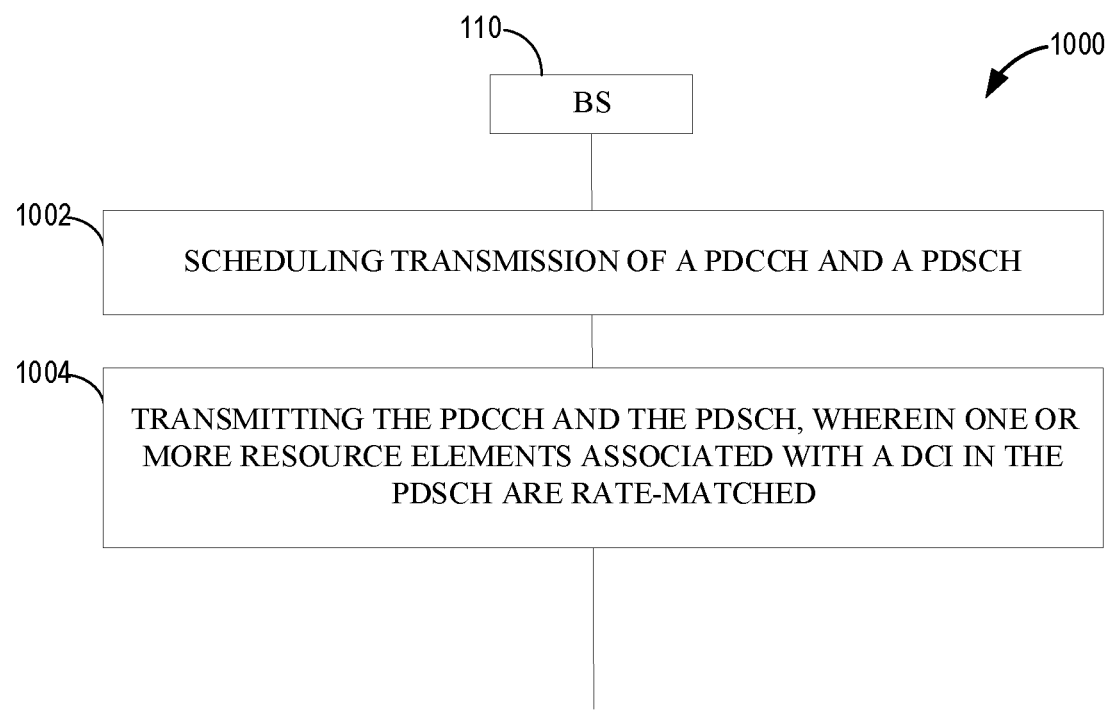
FIG. 10 illustrates another exemplary process of wireless communications according to an aspect of the disclosure.

At 904, BS 110 transmits the PDCCH and PDSCH to UE 120 (e.g., and possibly other UEs associated with the grant(s) in one or more DCIs of the PDSCH), and the UE 120 receives the PDCCH and PDSCH at 906. In this case, the piggybacked DCI in the PDSCH is effectively power-boosted via its restriction to a subset of the available PDSCH constellation points as described above with respect to FIGS. 6-8. In an example, 904-906 of FIG. 9 may correspond to 604 of FIG. 6 and 702-704 of FIG. 7, respectively. In an example, the transmission of the PDCCH and the PDSCH at 904-906 may occur within a single slot or across multiple slots. In an example, FIG. 10 illustrates an exemplary process 1000 of wireless communications according to an aspect of the disclosure. The process 1000 of FIG. 10 is performed by BS 110.

At 1002, BS 110 (e.g., scheduler 246, controller/processor 240, etc.) schedules, during at least one slot, transmission of a PDCCH and a PDSCH, the PDCCH including a first part of a DCI, the PDSCH including a second part of the DCI. In an example, the first and second parts of the DCI may comprise a two-part DCI as described above. In some designs, the first DCI part (or initial part of the DCI) in the PDCCH may comprise a control information field associated with the second part of the DCI within the PDSCH. In some designs, the second part of the DCI may comprise UL grant(s) and/or DL grant(s), and may be associated with a single UE or multiple UEs.

At 1004, BS 110 (e.g., antenna(s) 234*a* ... 234*t*, modulators(s) 232*a* ... 232*a*, TX MIMO processor 230, TX processor 220) transmits the PDCCH and the PDSCH during the at least one slot. In particular, one or more resource elements associated with the second part of the DCI in the PDSCH are rate-matched either sequentially, starting with a beginning of the one or more resource elements, or only if the PDSCH occurs within a threshold period of time following a DMRS (e.g., within a single symbol from the DMRS, within two symbols from a DMRS, etc.).

Figure 11:
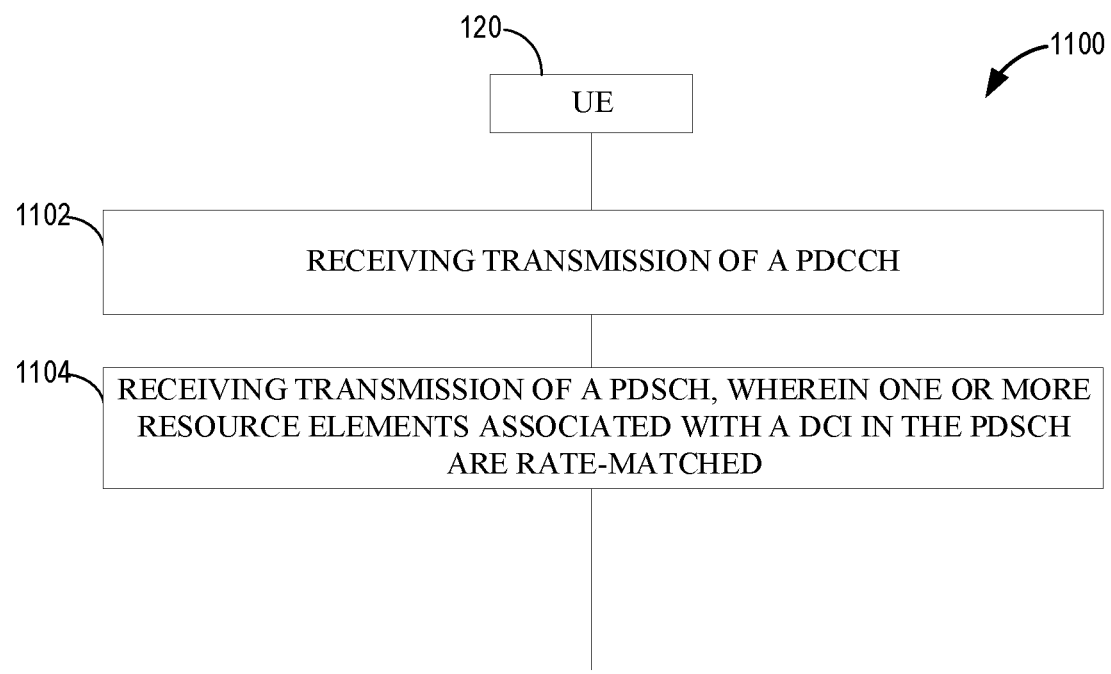
FIG. 11 illustrates another exemplary process of wireless communications according to an aspect of the disclosure.

FIG. 11 illustrates an exemplary process 1100 of wireless communications according to an aspect of the disclosure. The process 1100 of FIG. 11 is performed by UE 120.

At 1102, UE 120 (e.g., antenna(s) 252*a* ... 252*r*, MIMO detector 256, receive processor 258, etc.) receives, during at least one slot, transmission from a base station of a PDCCH. For example, the PDCCH portion may comprise a first DCI portion with a control information field associated with a second DCI portion (or piggybacked DCI) in an associated PDSCH.

At 1104, UE 120 (e.g., antenna(s) 252*a* ... 252*r*, MIMO detector 256, receive processor 258, etc.) receives, during the at least one slot, a PDSCH, the PDCCH including a first part of a DCI, the PDSCH including a second part of the DCI. In an example, the first and second parts of the DCI may comprise a two-part DCI as described above. In some designs, the first DCI part (or initial part of the DCI) in the PDCCH may comprise a control information field associated with the second part of the DCI within the PDSCH. In some designs, the second part of the DCI may comprise UL grant(s) and/or DL grant(s), and may be associated with a single UE or multiple UEs. In an example, the at least one slot may comprise a single slot or multiple slots. In particular, one or more resource elements associated with the second part of the DCI in the PDSCH are rate-matched either sequentially, starting with a beginning of the one or more resource elements, or only if the PDSCH occurs within a threshold period of time following a DMRS (e.g., within a single symbol from the DMRS, within two symbols from a DMRS, etc.).

Referring to FIGS. 10-11, the PDSCH may further comprise another part of another DCI (i.e., another piggybacked DCI) targeted to (at least) the same UE. In some cases, one of the piggybacked DCIs may have a higher priority than the other. For example, a first piggybacked DCI in the PDSCH may be associated with an Ultra-Reliable Low-Latency Communication (URLLC), while a second piggybacked DCI in the PDSCH may be associated with an enhanced Mobile Broadband (eMBB) communication. In some designs, the resource element(s) of the higher-priority piggybacked DCI may be rate-matched only if the PDSCH occurs within the threshold period of time following the DMRS, while the resource element(s) associated with the lower-priority piggybacked DCI may be rate-matched sequentially, starting with a beginning of its respective resource element(s).

Figure 12:
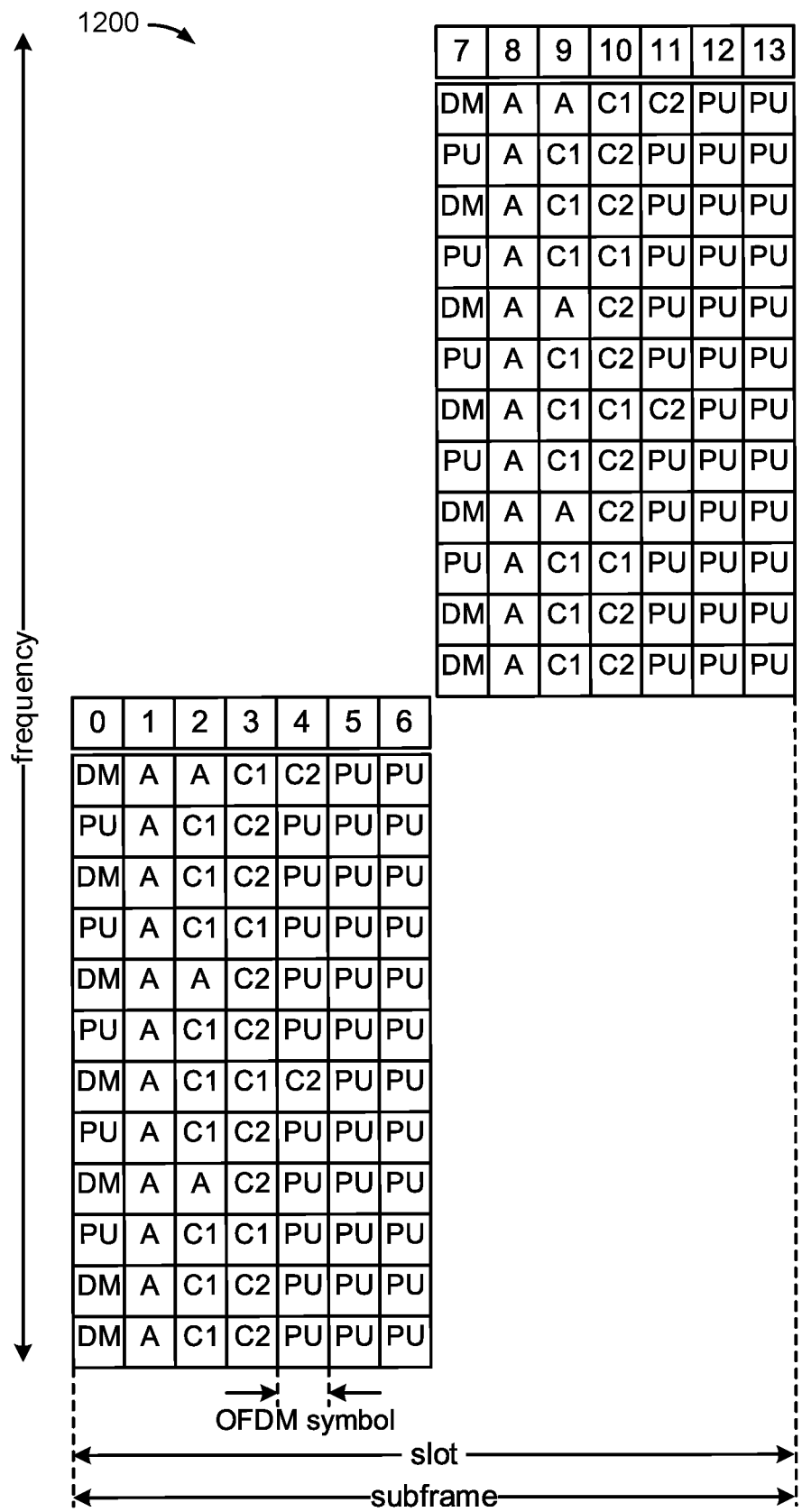
FIG. 12 illustrates an example resource allocation for a slot in accordance with an embodiment of the disclosure.

FIG. 12 illustrates an example resource allocation for a slot 1200 in accordance with an embodiment of the disclosure. In FIG. 12, DMRS REs are denoted as DM, Acknowledgment (ACK) REs are denoted as A, first part CSI REs (or CSI-1s) are denoted as C1, second part CSI REs (or CSI-2s) are denoted as C2, and PUSCH REs are denoted as PU. The slot 1200 depicted in FIG. 12 may be used for the transmission scheme described above with respect to FIGS. 10-11.

Figure 13:
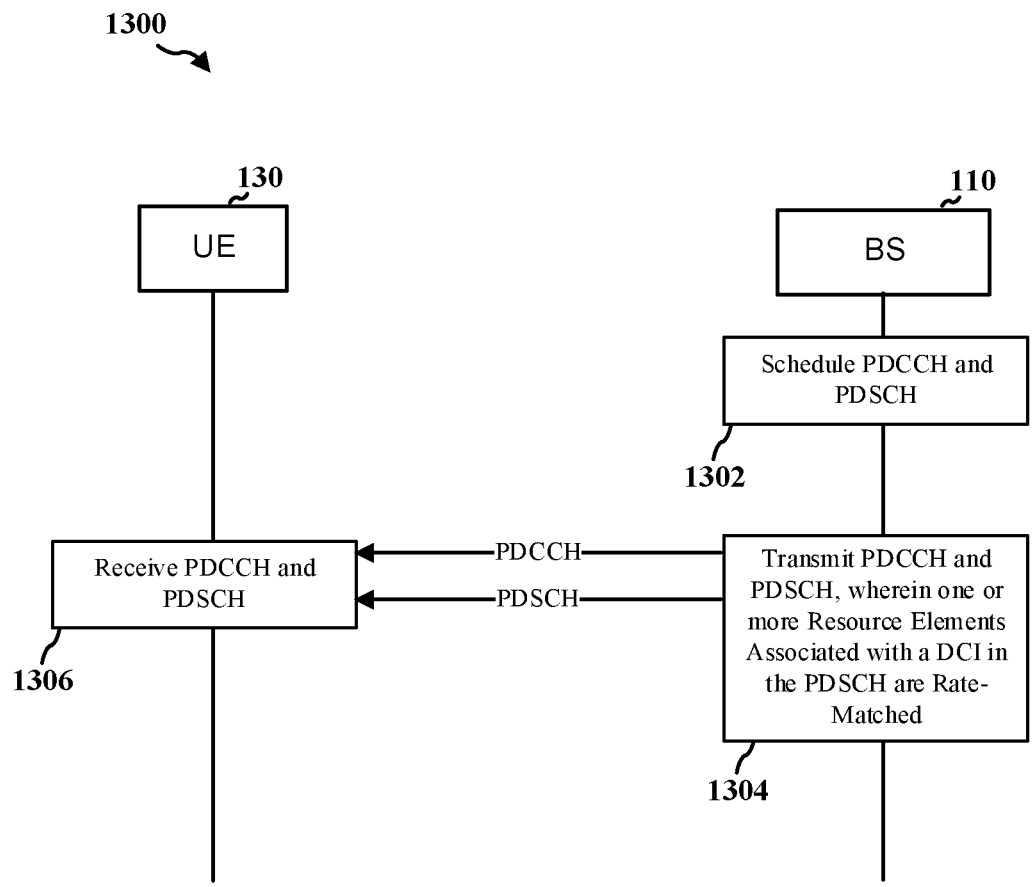
FIG. 13 illustrates an example implementation of the processes of FIGS. 6-7 in accordance with an embodiment of the disclosure.

FIG. 13 illustrates an example implementation 1300 of the processes 1000-1100 of FIGS. 10-11 in accordance with an embodiment of the disclosure.

At 1302, BS 110 schedules transmission of the PDCCH and PDSCH. In an example, 1302 may correspond to 1002 of FIG. 10 (e.g., the scheduled PDCCH may comprise an initial (or first) DCI part with the PDSCH comprising a piggybacked DCI that includes the second DCI part, etc.). The respective DCI parts may be associated with one or more grants, such as UL grant(s), DL grant(s) or a combination thereof, which in turn may be associated with a single UE or multiple UEs.

At 1304, BS 110 transmits the PDCCH and PDSCH to UE 120 (e.g., and possibly other UEs associated with the grant(s) in one or more DCIs of the PDSCH), and the UE 120 receives the PDCCH and PDSCH at 1306. In this case, the piggybacked DCI in the PDSCH is rate-matched in a selective manner as described above with respect to FIGS. 10-11. In an example, 1304-1306 of FIG. 13 may correspond to 1004 of FIG. 10 and 1102-1104 of FIG. 11, respectively.

Figure 14:
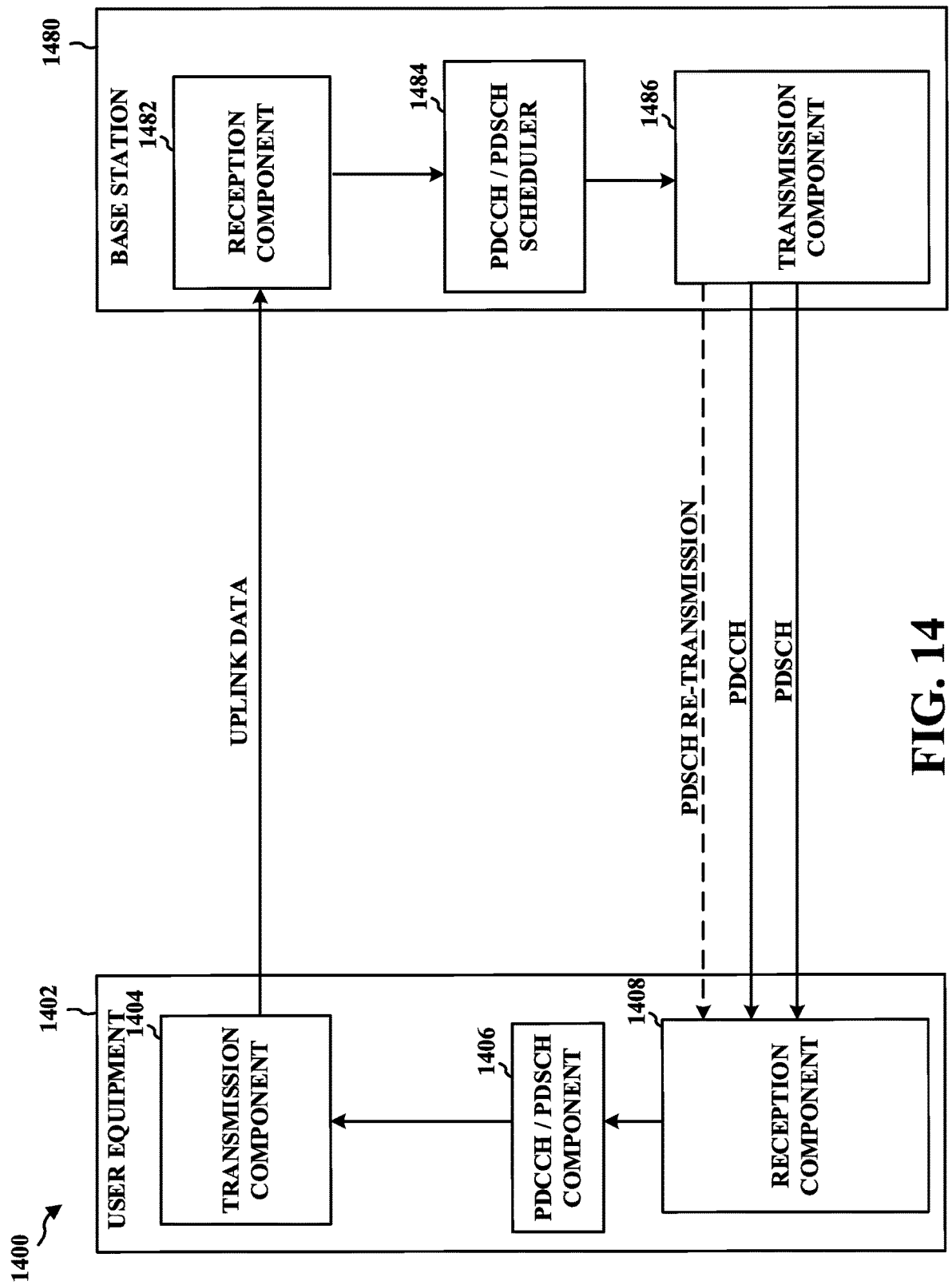
FIG. 14 is a conceptual data flow diagram illustrating the data flow between different means/components in exemplary apparatuses in accordance with an embodiment of the disclosure.

FIG. 14 is a conceptual data flow diagram 1400 illustrating the data flow between different means/components in exemplary apparatuses 1402 and 1480 in accordance with an embodiment of the disclosure. The apparatus 1402 may be a UE (e.g., UE 120) in communication with an apparatus 1480, which may be a base station (e.g., base station 110).

The apparatus 1402 includes a transmission component 1404, which may correspond to transmitter circuitry in UE 120 as depicted in FIG. 2, including controller/processor 280, antenna(s) 252a . . . 252r, modulators(s) 254a . . . 254r, TX MIMO processor 266, TX processor 264. The apparatus 1402 further includes PDCCH/PDSCH component 1406, which may correspond to processor circuitry in UE 120 as depicted in FIG. 2, including controller/processor 280, etc. The apparatus 1402 further includes a reception component 1408, which may correspond to receiver circuitry in UE 120 as depicted in FIG. 2, including controller/processor 280, antenna(s) 252a . . . 252r, demodulators(s) 254a . . . 254r, MIMO detector 256, RX processor 258.

The apparatus 1480 includes a reception component 1482, which may correspond to receiver circuitry in BS 110 as depicted in FIG. 2, including controller/processor 240, antenna(s) 234a . . . 234r, demodulators(s) 232a . . . 232r, MIMO detector 236, RX processor 238, communication unit 244. The apparatus 1480 further optionally includes a PDSCH/PDSCH scheduler 1484, which may correspond to processor circuitry in BS 110 as depicted in FIG. 2, including controller/processor 240. The apparatus 1480 further includes a transmission component 1486, which may correspond to transmission circuitry in BS 110 as depicted in FIG. 2, including e.g., controller/processor 240, antenna(s) 234a . . . 234r, modulators(s) 232a . . . 232r, Tx MIMO processor 230, TX processor 220, communication unit 244.

Referring to FIG. 14, the PDSCH/PDSCH scheduler 1484 schedules transmission of a PDCCH, a PDSCH, and (optionally) a re-transmission of the PDSCH in accordance with aspects of the disclosure. The transmission component 1486 transmits the PDCCH, the PDSCH, and (optionally) the re-transmission of the PDSCH to the reception component 1408. The PDCCH/PDSCH component 1406 processes (e.g., decodes, etc.) the PDCCH and PDSCH (e.g., determine TBS for PDSCH, rate-matching, demodulation, etc.). Uplink data may also be transmitted from the transmission component 1404 to the reception component 1482.

One or more components of the apparatus 1402 and apparatus 1480 may perform each of the blocks of the algorithm in the aforementioned flowcharts of FIGS. 3-7, 9-11 and 13. As such, each block in the aforementioned flowcharts of FIGS. 3-7, 9-11 and 13 may be performed by a component and the apparatus 1402 and apparatus 1480 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
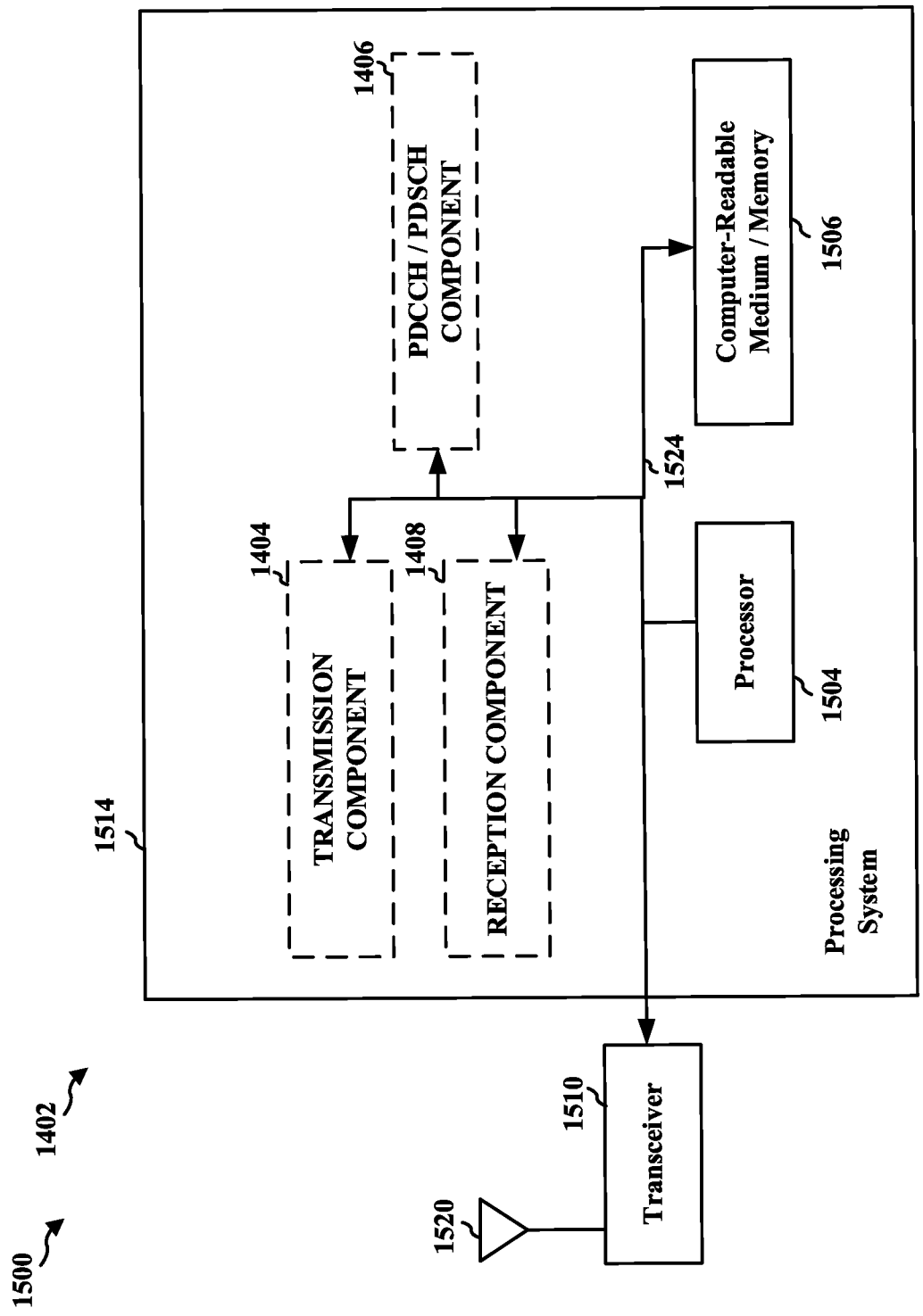
FIG. 15 is a diagram illustrating an example of a hardware implementation for an apparatus employing a processing system.

FIG. 15 is a diagram 1500 illustrating an example of a hardware implementation for an apparatus 1402 employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406 and 1408, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1408. In addition, the transceiver 1510 receives information from the processing system 1514, specifically the transmission component 1404, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406 and 1408. The components may be software components running in the processor 1504, resident/stored in the computer readable medium/memory 1506, one or more hardware components coupled to the processor 1504, or some combination thereof. The processing system 1514 may be a component of the UE 120 of FIG. 2 and may include the memory 282, and/or at least one of the TX processor 264, the RX processor 258, and the controller/processor 280.

In one configuration, the apparatus 1402 (e.g., a UE) for wireless communication includes means for receiving, receiving, during at least one slot, transmission from a base station of a Physical Downlink Control Channel (PDCCH) and a Physical Downlink Shared Channel (PDSCH), the PDCCH including a first part of a Downlink Control Information (DCI), the PDSCH including a second part of the DCI, and means for determining a transport block size (TBS) associated with the PDSCH.

In another configuration, the apparatus 1402 (e.g., a UE) for wireless communication includes means for receiving, during at least one slot, transmission from a base station of a Physical Downlink Control Channel (PDCCH) including a first part of a Downlink Control Information (DCI), and means for receiving, during the at least one slot, transmission from the base station of a Physical Downlink Shared Channel (PDSCH) including a second part of the DCI, wherein the PDSCH is received via a modulation scheme associated with a constellation having a plurality of constellation points, and wherein the second part of the DCI in the PDSCH is restricted to a subset of the plurality of constellation points.

In another configuration, the apparatus 1402 (e.g., a UE) for wireless communication includes means for receiving, during at least one slot, transmission from a base station of a Physical Downlink Control Channel (PDCCH) and a Physical Downlink Shared Channel (PDSCH), the PDCCH including a first part of a Downlink Control Information (DCI), the PDSCH including a second part of the DCI, and means for rate-matching one or more resource elements associated with the second part of the DCI in the PDSCH: sequentially, starting with a beginning of the one or more resource elements, or only if the PDSCH occurs within a threshold period of time following a Demodulation Reference Signal (DMRS).

The aforementioned means may be one or more of the aforementioned components of the apparatus 1402 and/or the processing system 1514 of the apparatus 1402 configured to perform the functions recited by the aforementioned means. As described supra, the processing system 1514 may include the TX processor 264, the RX processor 258, and the controller/processor 280.

Figure 16:
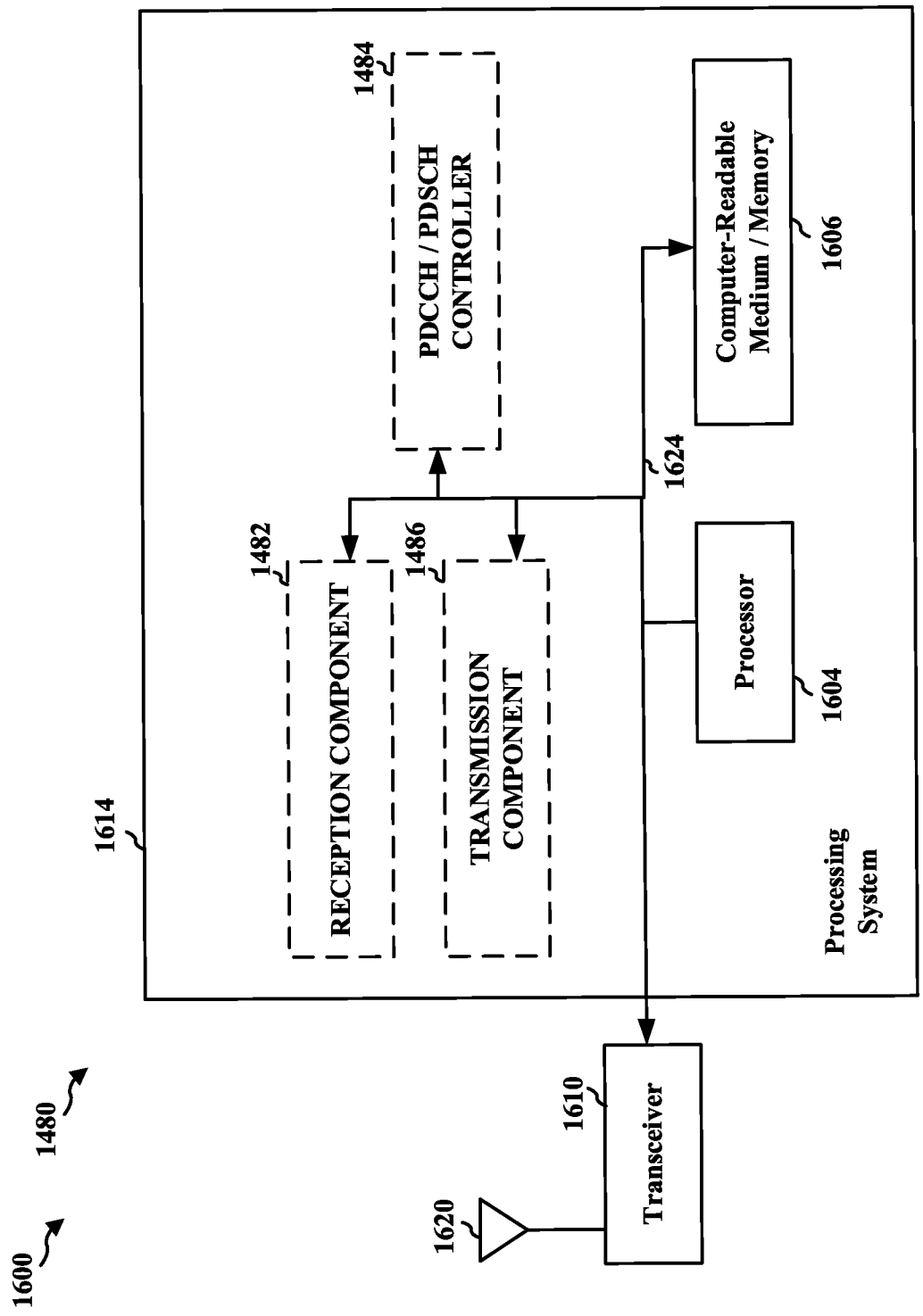
FIG. 16 is a diagram illustrating another example of a hardware implementation for an apparatus employing a processing system.

FIG. 16 is a diagram 1600 illustrating an example of a hardware implementation for an apparatus 1480 employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1482, 1484 and 1486, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1482. In addition, the transceiver 1610 receives information from the processing system 1614, specifically the transmission component 1486, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1482, 1484 and 1486. The components may be software components running in the processor 1604, resident/stored in the computer readable medium/memory 1606, one or more hardware components coupled to the processor 1604, or some combination thereof. The processing system 1614 may be a component of the BS 110 of FIG. 2 and may include the memory 242, and/or at least one of the TX processor 220, the RX processor 238, and the controller/processor 240.

In one configuration, the apparatus 1480 (e.g., a BS) for wireless communication includes means for scheduling, during at least one slot, transmission of a Physical Downlink Control Channel (PDCCH) and a Physical Downlink Shared Channel (PDSCH), the PDCCH including a first part of a Downlink Control Information (DCI), the PDSCH including a second part of the DCI, wherein the scheduling includes determining a transport block size (TBS) associated with the PDSCH, and means for transmitting the PDCCH and the PDSCH during the at least one slot, wherein the PDSCH is transmitted in accordance with the determined TBS.

In another configuration, the apparatus 1480 (e.g., a BS) for wireless communication includes means for scheduling, during at least one slot, transmission of a Physical Downlink Control Channel (PDCCH) and a Physical Downlink Shared Channel (PDSCH), the PDCCH including a first part of a Downlink Control Information (DCI), the PDSCH including a second part of the DCI, and means for transmitting the PDCCH and the PDSCH during the at least one slot, wherein the PDSCH is transmitted via a modulation scheme associated with a constellation having a plurality of constellation points, and wherein the second part of the DCI in the PDSCH is restricted to a subset of the plurality of constellation points.

In another configuration, the apparatus 1480 (e.g., a BS) for wireless communication includes means for scheduling, during at least one slot, transmission of a Physical Downlink Control Channel (PDCCH) and a Physical Downlink Shared Channel (PDSCH), the PDCCH including a first part of a Downlink Control Information (DCI), the PDSCH including a second part of the DCI, wherein the scheduling includes a determination of a transport block size (TBS) associated with the PDSCH, and means for transmitting the PDCCH and the PDSCH during the at least one slot, wherein one or more resource elements associated with the second part of the DCI in the PDSCH are rate-matched: sequentially, starting with a beginning of the one or more resource elements, or only if the PDSCH occurs within a threshold period of time following a Demodulation Reference Signal (DMRS).

The aforementioned means may be one or more of the aforementioned components of the apparatus 1480 and/or the processing system 1614 of the apparatus 1480 configured to perform the functions recited by the aforementioned means. As described supra, the processing system 1614 may include the TX processor 220, the RX processor 238, and the controller/processor 240.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of operating a network component, comprising:
    scheduling, during at least one slot, transmission of a Physical Downlink Control Channel (PDCCH) and a Physical Downlink Shared Channel (PDSCH), the PDCCH including a first part of a Downlink Control Information (DCI), the PDSCH including a second part of the DCI, wherein the scheduling includes determining a transport block size (TBS) that is associated with the PDSCH and that is based on a discount attributable to resource elements allocated for transport of the second part of the DCI of the PDSCH; and; and
    transmitting the PDCCH and the PDSCH during the at least one slot,
    wherein the PDSCH is transmitted in accordance with the determined TBS.

2. The method of claim 1, wherein the first and second parts of the DCI comprise a two-part DCI.

3. The method of claim 1, wherein the TBS is determined before an allocation of the resource elements among a set of PDSCH resource elements for transport of the second part of the DCI.

4. The method of claim 3, wherein the TBS is determined using a modulation and coding scheme (MCS) of the PDSCH as a tuning parameter to adjust the determined TBS to offset a coding rate associated with the resource elements allocated for transport of the second part of the DCI.

5. The method of claim 1, wherein the first part of the DCI includes a control information field associated with the second part of the DCI within the PDSCH.

6. The method of claim 5, wherein the TBS is determined based on a set of resources occupied by PDSCH data and excludes a subset of the set of resource elements allocated for transport of the second part of the DCI.

7. The method of claim 6,
    wherein the control information field indicates a number of resource elements in the subset, and
    wherein the TBS determination subtracts the number of resource elements in the subset from a total number of the set of resource elements occupied by the PDSCH data.

8. The method of claim 6, further comprising:
    re-transmitting the PDSCH in accordance with the determined TBS.

9. The method of claim 5, wherein the TBS is determined in accordance with a TBS adjustment that is indicated to the UE.

10. The method of claim 9,
    wherein the TBS adjustment is indicated to the UE as a percentage of TBS size reduction in the determined TBS, or
    wherein the TBS adjustment is indicated the UE as an absolute TBS size reduction in the determined TBS, or
    wherein the TBS adjustment is indicated to the UE via the control information field of the first part of the DCI in the PDCCH, or
    wherein the TBS adjustment is indicated to the UE via the second part of the DCI in the PDSCH.

11. The method of claim 5, wherein the TBS is determined in accordance with a TBS adjustment that is indicated by the control information field.

12. The method of claim 11,
    wherein the TBS adjustment is indicated to the UE as a size of the second part of the DCI within the PDSCH, and
    wherein the size is conveyed via the control information field.

13. The method of claim 1,
    wherein the PDCCH and the PDSCH are transmitted during the same slot, or
    wherein the PDCCH is transmitted during a first slot and the PDSCH is transmitted during a second slot that follows the first slot.

14. The method of claim 1,
    wherein the second part of the DCI comprises one or more downlink (DL) grants, one or more uplink (UL) grants, or a combination thereof, or
    wherein the second part of the DCI comprises a first grant associated with a first UE and a second grant associated with a second UE, or
    a combination thereof.

15. A method of operating a user equipment (UE), comprising:

receiving, during at least one slot, transmission from a network component of a Physical Downlink Control Channel (PDCCH) and a Physical Downlink Shared Channel (PDSCH), the PDCCH including a first part of a Downlink Control Information (DCI), the PDSCH including a second part of the DCI; and determining a transport block size (TBS) that is associated with the PDSCH and that is based on a discount attributable to resource elements allocated for transport of the second part of the DCI of the PDSCH.

16. The method of claim 15, wherein the first and second parts of the DCI comprise a two-part DCI.

17. The method of claim 15, wherein the TBS is determined before an allocation of the resource elements among a set of PDSCH resource elements for transport of the second part of the DCI.

18. The method of claim 15, wherein the first part of the DCI includes a control information field associated with the second part of the DCI within the PDSCH.

19. The method of claim 18, wherein the TBS is determined based on a set of resources occupied by PDSCH data and excludes a subset of the set of resource elements allocated for transport of the second part of the DCI.

20. The method of claim 19,
wherein the control information field indicates a number of resource elements in the subset, and
wherein the TBS determination subtracts the number of resource elements in the subset from a total number of the set of resource elements occupied by the PDSCH data.

21. The method of claim 19, further comprising:
receiving a re-transmission of the PDSCH in accordance with the determined TBS.

22. The method of claim 18, wherein the TBS is determined in accordance with a TBS adjustment that is indicated to the UE.

23. The method of claim 22,
wherein the TBS adjustment is indicated to the UE as a percentage of TBS size reduction in the determined TBS, or
wherein the TBS adjustment is indicated the UE as an absolute TBS size reduction in the determined TBS, or
wherein the TBS adjustment is indicated to the UE via the control information field of the first part of the DCI in the PDCCH, or
wherein the TBS adjustment is indicated to the UE via the second part of the DCI in the PDSCH.

24. The method of claim 18, wherein the TBS is determined in accordance with a TBS adjustment that is indicated by the control information field.

25. The method of claim 24,
wherein the TBS adjustment is indicated to the UE as a size of the second part of the DCI within the PDSCH conveyed, and
wherein the size is conveyed via the control information field.

26. The method of claim 15,
wherein the second part of the DCI comprises one or more downlink (DL) grants, one or more uplink (UL) grants, or a combination thereof, or
wherein the second part of the DCI comprises a first grant associated with a first UE and a second grant associated with a second UE, or
a combination thereof.

* * * * *